United States Patent [19]

Hiramatsu

[11] Patent Number: 4,483,604
[45] Date of Patent: Nov. 20, 1984

[54] FOCUS DETECTING DEVICE WITH SHIELDING

[75] Inventor: Akira Hiramatsu, Kanagawa, Japan

[73] Assignee: Canon Kabushiki Kaisha, Tokyo, Japan

[21] Appl. No.: 494,770

[22] Filed: May 13, 1983

[30] Foreign Application Priority Data

May 21, 1982 [JP] Japan .................................. 57-84847

[51] Int. Cl.³ .............................................. G03B 3/10
[52] U.S. Cl. ..................................... 354/402; 354/481
[58] Field of Search ................ 354/400, 402, 406, 481

[56] References Cited

U.S. PATENT DOCUMENTS 4,253,752 3/1981 Ichihara .............................. 354/402
4,322,615 3/1982 Fukuhara ............................ 354/402
4,322,616 3/1982 Fukuhara et al. ................... 354/402

Primary Examiner—Russell E. Adams
Attorney, Agent, or Firm—Toren, McGeady and Stanger

[57] ABSTRACT

A camera focus detecting device in which the first and the second images are respectively formed by a pair of secondary image forming lenses behind an expected focusing plane of a principal image forming lens. The focusing of the principal image forming lens is detected from position changes of the first and second images relative to a pair of photoelectric transducers on or near the focusing planes of the above pair of secondary image forming lenses so as to detect the position of the images. A first member, whose movement amount changes according to an F-number of the above principal image forming lens, and a second member, which moves in a certain determined direction when the first member moves to a certain determined position, are provided. With the movement of the second member the light shading amount of the light shading apparatus provided in front of the secondary image forming lens is changed to vary the above amount of light shading for the stepwise change of the F-number.

6 Claims, 5 Drawing Figures

FOCUS DETECTING DEVICE WITH SHIELDING

BACKGROUND OF THE INVENTION

1. Field of the Invention

The present invention relates to a focus detecting device, particularly suitable for cameras with interchangeable photographing lenses.

2. Description of the Prior Art

Until now, many camera focus detecting devices have been proposed, in which the first and the second images are respectively formed by means of a pair of secondary image forming lenses behind a position conjugate the film plane in a camera. The focusing condition of the principal image forming lens is detected from the position changes of the above first and second images relative to a pair of photoelectric transducers on or near the focusing planes of the above pair of secondary image forming lenses.

However, the focus detecting devices mentioned above have inherent disadvantages. When using a principal image forming lens, particularly when an interchangeable photographing lens is mounted on a single lens reflex camera, correct focus detection is difficult because of vignetting due to the large iris of the photographing lens.

The shortcomings of the conventional devices will be explained with reference to FIG. 1. FIG. 1 is a schematic view of the distance measuring optical system of such focus detecting devices. In the drawing, the light beam having passed the photographing lens 1 is converged upon the expected focus plane 2 and is then diverged. A part of the light beam having passed the photographing lens 1 is converged and imaged upon the light receiving planes of a pair of photoelectric transducers 4, 4' consisting, of photoelectric transducing elements, by means of a pair of secondary image forming lenses 3, 3' arranged symmetrically with respect to the optical axis of the photographing lens 1. The pair of photoelectric transducers 4, 4' serve to detect the position of the image and consist of a series of photoelectric transducing elements. It is important that the brightness distribution on the light sensing surfaces of the photoelectric transducers 4, 4' be equal for a certain object when such focus detecting devices are used. The reason is that focus detection is carried out by comparison of photoelectric outputs of the photoelectric transducers 4, 4' for the same portion of the image.

In FIG. 1, the light beams incident on the upper end light receiving surface 4a, the center light receiving surface 4c and the lower end light receiving surface 4b of the first photoelectric transducer 4 are projected reversely from these light receiving surfaces of the iris of the photographing lens 1 through the secondary image forming lens 3. Thus, the light beam having the divergence of a1, a2 and a3 falls on the upper end light receiving surface 4a and the light beam having the divergence of c1, c2 and c3 falls on the center light receiving surface 4c. The divergence of a1, a2 and a3 and that of c1, c2 and c3 are determined by the effective F-number of the secondary image forming lens 3 and are almost equal to each other. However, when the light beam is reversely projected on the lower end light receiving surface 4b just as on the former two light receiving surfaces, the light beam falling on the lower end light receiving surface 4b has the divergence of b1, b2 and b3. And when the iris of the photographing lens 1 is small, part of the light beam is vignetted at the upper end of the photographing lens 1 so that only the light beam of the divergence b1, b2 and b3 falls on the lower end light receiving surface 4b. This means that when an object having an even brightness distribution is measured, the brightness on the upper end and central light receiving surfaces 4a, 4c is lower than that on the lower end light receiving surface 4b. Thus, it is impossible to obtain the brightness distribution corresponding to that of the object on the light receiving surface of the photoelectric transducer.

This phenomenon also takes place in connection with the second photoelectric transducer 4' and the brightness on the upper end light receiving surface 4'a on which the light beam which is vignetted at the lower end portion of the photographing lens 1 falls is lower than that on the center surface 4'b and lower end surface 4'c. Here, the image formed on the lower end light receiving surface 4b is the same as that formed on the upper end surface 4'a, while the brightness reproductivity of the object image is different depending upon the portions of the object, so that the brightness distribution of the images upon both photoelectric transducers 4, 4' is not same. Consequently, it is impossible to correctly compare the outputs of the photoelectric transducing elements of the photoelectric transducers, 4, 4', thus resulting in errors in focus detection.

In order to overcome this disadvantage, a device has been proposed, as disclosed in U.S. Pat. No. 4,322,616, which restricts the aperture of the secondary image forming lenses 3, 3' with the shading plates 5, 5' according at the smallest F-number of the photographing lens 1 compensating for the focus detection error due to vignetting. However, in this prior art device, the pin for transferring the smallest F-number of the photographing lens to the camera directly contacts the cam plane on one of the shading plates 5, 5' so as to vary the aperture of the secondary image forming lenses 3, 3', depending on the pin position for transferring the smallest F-number, so that the following disadvantages have been confronted.

In such a focus detecting device, it is necessary that the apertures of the pair of the secondary image forming lenses 3, 3' always be symmetrical so that the mechanism is accurate in keeping the cam plane and the shading plate 5, 5' in linking engagement in such a manner that the pair of shading plates 5, 5' are always symmetrical. This requires very troublesome assembly and adjustment.

Also in the prior art device, the position of the shading plates changes every time the smallest F-number of the photographing lens changes so that adjustment is all the more troublesome. In fact, it is ideal to compensate for the aperture of the secondary image forming lenses 3, 3' every time the smallest F-number of the photographing lens 1 changes. However, when the smallest set F-number is in a certain determined range, even if the positions of the shading plates 5, 5' are fixed, the vignetting influence is negligible. Building such a device into the camera, is inconvenient because of the troublesome assembly required.

It is accordingly an object of the present invention to provide a highly practicable focus detecting device.

SUMMARY OF THE INVENTION

The focus detecting device includes a pair of secondary image forming lenses behind the expected focus plane of the principal image forming lens and a photoelectric transducer arranged behind these lenses, so designed that the shading members in front of the secondary image forming lenses can be controlled by a member for transferring the smallest F-number of the principal image forming lens to the camera. The aperture of the secondary image forming lens is determined by the shading means and is changed when the smallest F-number is outside a predetermined range, thus eliminating complicated adjustment when the device is built into the camera.

Other objects of the present invention will be clear from the description which will be made with reference to the accompanying drawings.

DETAILED DESCRIPTION OF THE PREFERRED EMBODIMENTS

Figure 1:
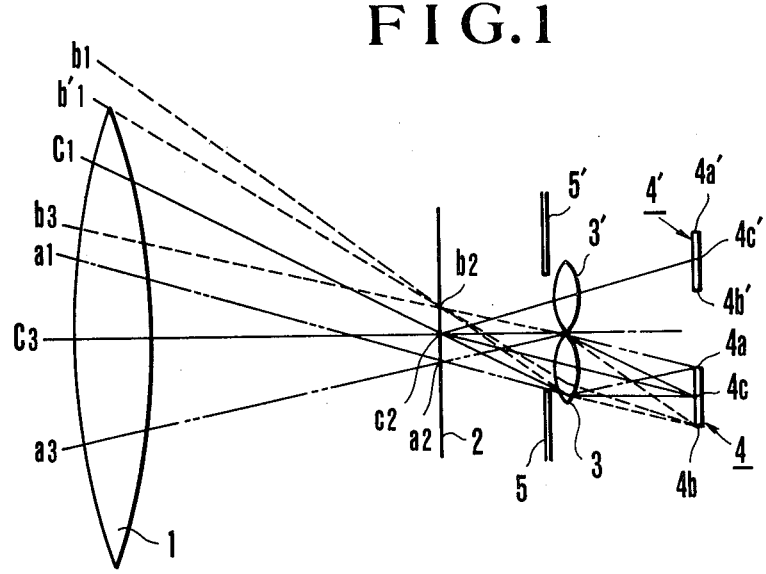
FIG. 1 is a schematic plane view of the distance measuring optical system of the focus detecting device.
Figure 2:
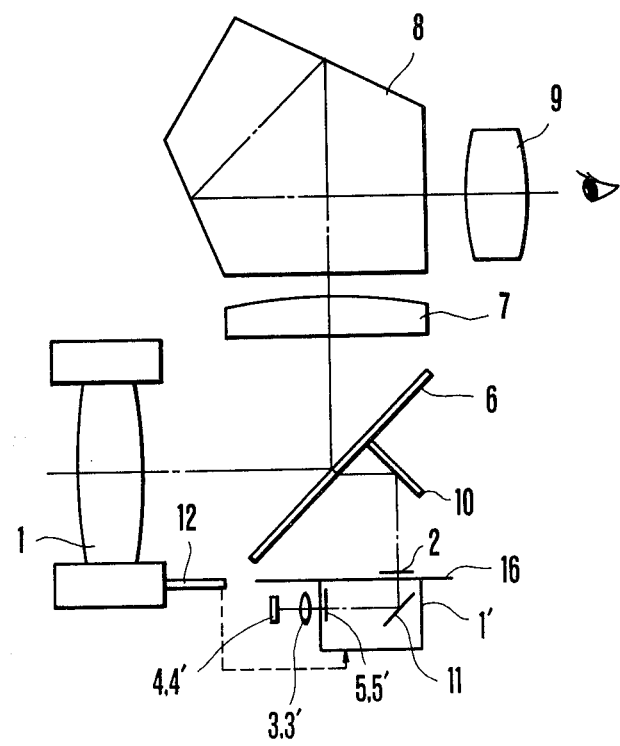
FIG. 2 is a partially schematic sectional view of a camera which includes the focus detecting device of the present invention.

In FIG. 2, a principal mirror 6, a focusing plate 7, a pentagonal prism 8 and an eye piece lens 9 form view finder optical system. A sub-mirror 10 deflects the light beam having passed a photographing lens 1 (a principal image forming lens) and the principal mirror 6 toward the focus detecting optical system. A mirror 11 reflects the light beam reflected from the sub-mirror 10. These mirrors 6, 10, 11 form a focus detecting optical system together with secondary image forming lenses 3, 3', photoelectric transducers 4, 4' and shading plates 5, 5'. (In the drawing only one of the secondary lenses 3, 3', the photoelectric transducers 4, 4' and the shading plates 5, 5' are shown because they are perpendicular to the drawing.) A base plate 16 holds the secondary image forming lenses 3, 3', the photoelectric transducer 4, 4', the shading plates 5, 5', the mirror 11 and so on. An aperture compensating device 1' compensates the aperture of the secondary image forming lenses 3, 3' along with the movement of the shading plates 5, 5' and sets the shading plates 5, 5' stepwise by a pin 12 which transfers the smallest F-number of the photographing lens 1 from the photographing lens 1 to the aperture compensating device 1'.

Figure 3A:
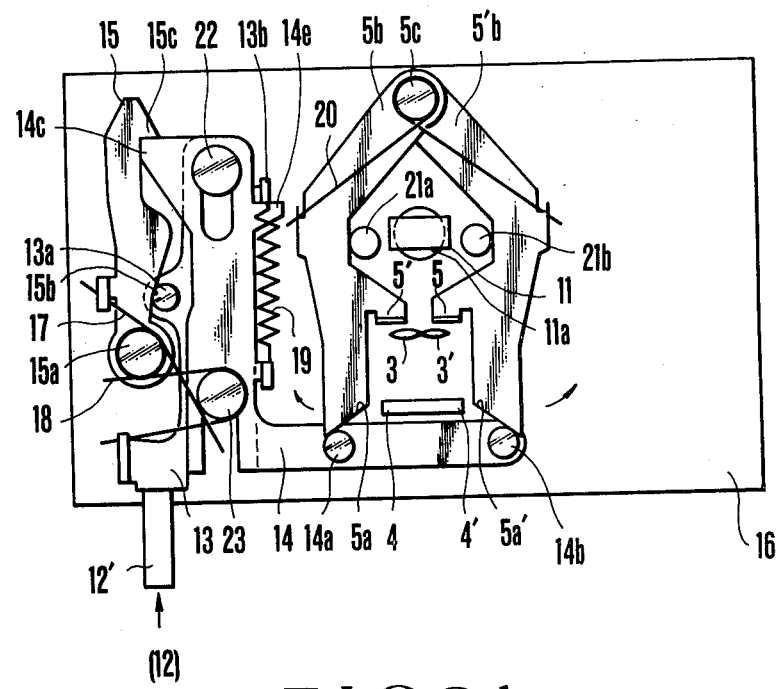
FIGS. 3(a), (b) are respectively schematic views showing the focus detecting device of the present invention.
Figure 4:
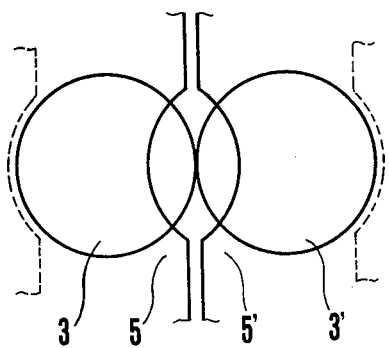
FIG. 4 is a schematic view showing the open and closed states of the shading plates.

FIGS. 3(a) and (b) respectively show embodiments of the present invention. A signal pin 12' cooperates with the transmission pin 12 in FIG. 2 and slides along the arrow in the drawing to transmit the signal. A connecting lever 13 responds to the movement of the signal pin 12' and is held on the base plate 16 so as to be moved in parallel by shafts 22, 23 fixed on the base plate 16. A driving lever 14 is held on the base plate 16 together with the connecting lever 13 by means of shafts 22, 23 and moves in the same direction as the connecting lever 13, namely the direction in which the shafts 22 and 23 are connected. A hook 15 engages one end 14c of the driving lever 14 and is rotatably held by a shaft 15a provided on the base plate 16. A spring 17 urges the hook 15 clockwise, a spring 18 urges the connecting lever 13 downwards in the drawing and a spring 19 urges the connecting lever 13 and the driving lever 14 in inversed directions to each other (in the same direction that the connecting lever 13 and the driving lever 14 move). Rotary discs 5b and 5b' have ends which rotate around a shaft 5c fixed on the base plate 16 and their other ends are provided with cam parts 5a and 5'a which are inclined inwards. The rotary discs 5b and 5'b are provided at their interior median with projections symmetrical with respect to a boundary between the secondary image forming lenses 3, 3'. These projections serve as the shading plates 5, 5' which, as shown in FIG. 4, shade the secondary image forming lenses 3, 3' from the external ends compensating the aperture. A spring 20 urges the rotary disc 5b, 5'b held on the base plate 16 with the shaft 5c in inversed directions to each other and stopper pins 21a and 21b of the rotary discs 5b, 5'b adjust the shading plates 5, 5' in the most closed condition. In the condition shown in FIG. 3(a), the rotary discs 5b, 5b' which are in contact with the pins 21a and 21b are held in the shown positions. Pins 14a and 14b are provided on the driving lever 14 in a direction perpendicular to the moving direction of the driving lever 14 and are in contact with the cam parts 5a and 5'a of the rotary discs 5b and 5'b. The mirror 11 directs the light beam coming through an opening 16a in the base base plate 16 toward the secondary image forming lenses 3, 3'. The photographic transducers 4, 4' are on the image forming planes of the lenses 3, 3'. Photoelectric transducers 4, 4' are arranged. The mirror 11, the secondary lenses 3, 3' and the photoelectric transducers 4, 4' are fixed on the base plate 16 by suitable means (not shown). On the other hand, the connecting lever 13 is provided with a stopper 13b, while the driving lever 14 is provided with a claw part 14e engageable with the stopper 13b, whereby the movement of the driving lever 14 is stopped. The connecting lever 13 is provided with a pin 13a, which is in contact with the cam part 15b of the hook 15 in such a manner that when the pin 13a is moved upwards together with the connecting lever 13, the hook 15 rotates in a counterclockwise direction around the shaft 15a. The apparatus also includes a claw 14c of the driving lever 14, and a hook 15c which is part of the hook 15. The claw 14c and the hook 15c are disengaged from each other when the pin 13a moves upwards by more than a predetermined amount.

FIG. 4 shows the open and closed conditions of the shading plates 5, 5' to the secondary image forming lenses 3, 3' when the embodiment is in the condition shown in FIGS. 3(a) and (b). In the drawing, the shading plates 5, 5' are shown by a solid line in the condition in FIG. 3(a) in which the aperture is mostly closed while the plates 5, 5' are shown by a dotted line in the condition in FIG. 3(b) in which the aperture is most open.

Below, the operation of the above embodiment will be described. First the condition where the F-number of the photographing lens 1 is small and the brightness is high will be explained. In FIG. 2, when the photographing lens 1 is mounted on the camera body, the transmission pin 12 whose projection corresponds to the smallest F-number of the photographing lens 1 (the larger the projection of the transmission pin 12 is, the smaller the F-number is) pushes the signal pin 12' in the direction of the arrow in the drawing by the amount corresponding to the projection. Thus, at this time, the connecting lever 13 slides, in the direction of the arrow in the drawing, an amount corresponding to the degree of movement of the signal pin 12', namely the amount corresponding to the projection of the transmission pin 12. At this time, the pin 13a fixed on the connecting lever 13 contacts the cam part 15b of the hook 15, which starts to rotate counterclockwise against the force of the spring 17. At the same time, the connecting lever 13 expands the spring 19 to store the spring force When the signal pin 12' is pushed in by more than a predetermined amount, the hook part 15c of the hook 15 is disengaged from the claw part 14c at one end of the driving lever 14, which moves upwards in the drawing (in the direction of the arrow) by the force of the spring 19, stored by the connecting lever 13, whereby the stopper 13b on the connecting lever 13 contacts the claw part 14e on the driving lever 14. At this time, the pins 14a, 14b on the driving lever 14 are in contact respectively with the cam parts 5a, 5'a at the ends of the rotary discs 5b, 5'b, whereby the rotary discs 5b, 5'b and the shading plates 5, 5' are rotated in the direction of the arrow in the drawing assuming the condition shown in FIG. 3(b). In this way, the shading plates 5, 5' withdraw from the front of the secondary image forming lenses 3, 3' opening the aperture of the secondary image forming lenses 3, 3'.

Figure 3B:
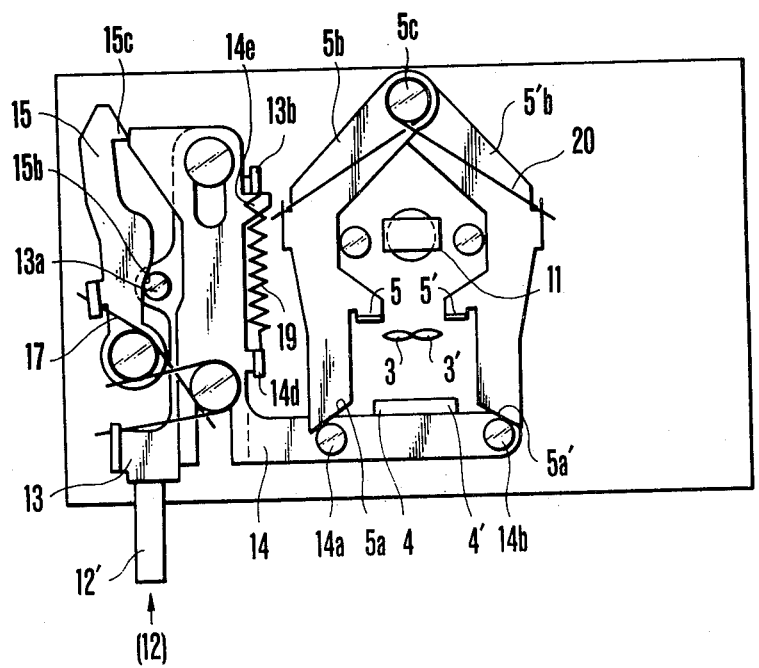

On the other hand, when the F-number of the photographing lens 1 is large and the brightness is low, the aperture compensating device 1' remains in the condition shown in FIG. 3(a). In this situation the projection amount of the transmission pin 12 in FIG. 2 is smaller, so that even when the transmission pin 12 pushes the signal pin 12' in FIG. 3 upwards in the drawing (in the direction of the arrow), the movement of the connecting lever 13 is less than the predetermined amount so that it is impossible to disengage the hook 15 from the driving lever 14. For this reason, the driving lever 14 is held in the condition shown in FIG. 3(a), while the shading plates 5, 5' keep the aperture of the secondary image lenses 3, 3' small. Thus, in the photographing lens 1 where the transmission pin 12 projection amount is less than the predetermined amount (where the F-number of the photographing lens 1 is large) the apertures of the secondary image forming lenses 3, 3' are adjusted as shown by the solid line in FIG. 4. In the photographing lens 1 where the projection amount of the transmission pin 12 is greater (where the F-number of the photographing lens 1 is small), the shading plates 5, 5' withdraw from the front of the secondary image forming lens 3, 3', as is shown by the dotted line in FIG. 4, so that the aperture of the lenses 3, 3' is not influenced. More specifically, when the photographing lens 1 is brighter than F2.8, the aperture of the lens 3, 3' is open as shown in FIG. 3(b), while when the lens 1 is darker than F2.8, the aperture of the lens 3, 3' is closed as shown in FIG. 3(a).

Although, in the foregoing embodiment, the aperture of the secondary image forming lenses 3, 3' are changed by two steps, it is possible to change the aperture by three steps with the addition of a similar structure.

In the present invention it is possible to vary the aperture of the secondary image forming lenses 3, 3' formed by the shading plates 5, 5' provided in front of the secondary image forming lenses 3, 3' with reference to a determined F-number by the conventional F-number transmission pin 12 provided in the photographing lens 1 for controlling the exposure. In this manner a convenient focus detecting device both easily adjusted and highly practical, can be offered.

What I claim:

1. A focus detecting device for detecting a focusing state of an objective comprising:
    (a) optical means for forming a plurality of images in a relative positional relationship which changes depending on a focusing condition of an objective on the basis of a light passing through the objective;
    (b) discriminating means to discriminate whether a fully opened F-number of the objective is larger or smaller than a predetermined value; and
    (c) shading means for changing an aperture in a stepwise manner corresponding to each image formed by the optical means on the basis of the discrimination results of the discriminating means.

2. A focus detecting device according to claim 1, in which the shading means comprises a driving member which starts movement in a predetermined direction when it is released on the basis of the discrimination result of the discriminating means.

3. A focus detecting device according to claim 2, in which the shading means comprises:
    (a) a shading member provided for every aperture of the optical means; and
    (b) a transferring member to shift the shading member from a first position to a second position corresponding to the movement of the driving member, said transferring member being provided for every shading member.

4. A focus detecting device according to claim 3, in which the shading means comprises:
    (a) an urging member to urge the shading member from the second position toward the first position; and
    (b) a holding member to hold the shading member at the first position against the urging force of the urging member, said holding member being provided for every shading member.

5. A focus detecting device according to claim 4, in which each shading member is supported by a common shaft in a freely rotatable manner.

6. A focus detecting device according to claim 5, in which each one of the transferring members is provided along a direction perpendicular to the movement direction of the driving member.

* * * * *